Figure 1:
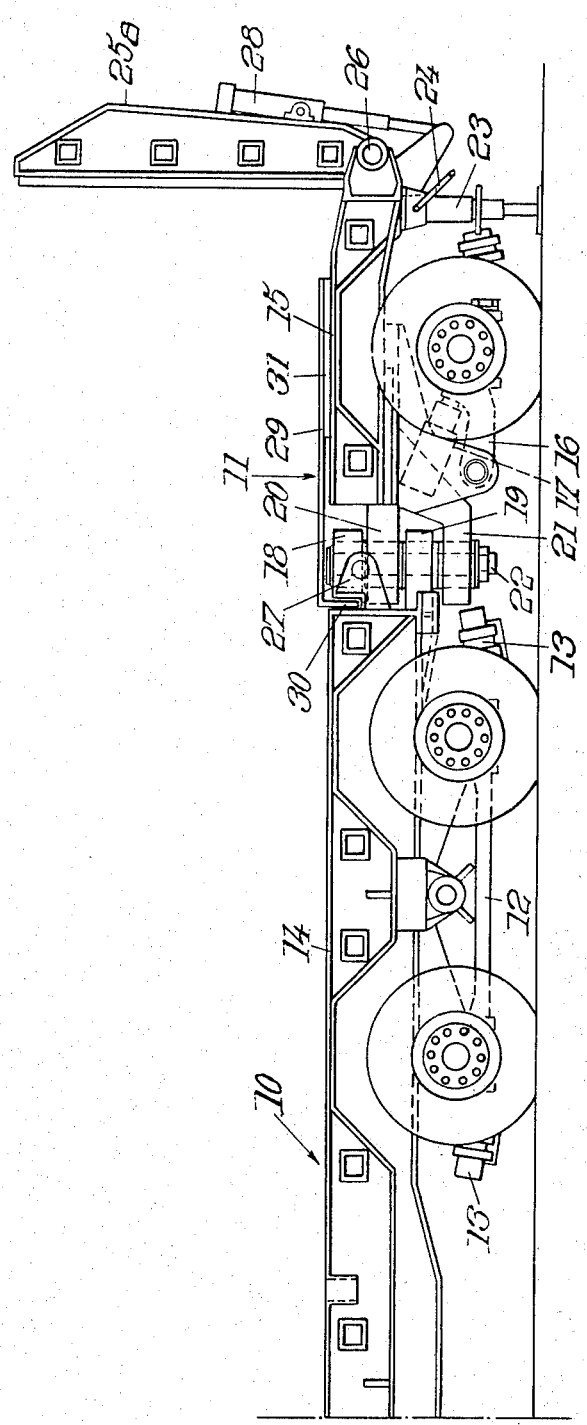

United States Patent [19]

Michaud

[11] 3,910,601
[45] Oct. 7, 1975

[54] EXTENSION MODULE FOR A VEHICLE TO BE INCORPORATED IN A TRAILER SYSTEM

[75] Inventor: Jean-Jacques Michaud, Auxerre, France

[73] Assignee: Establissement Jean Nicolas et Fils, Champs-sur-Yonne, France

[22] Filed: July 29, 1974

[21] Appl. No.: 492,728

[30] Foreign Application Priority Data
Aug. 7, 1973 France .................. 73.28878

[52] U.S. Cl. ...... 280/415 R; 280/405 A; 280/423 R
[51] Int. Cl.² ........................................ B60F 1/00
[58] Field of Search ........ 280/415 R, 415 A, 415 B, 280/405 A, 423 R, 423 A, 423 B, 474; 180/52, 53, 81 R; 214/85

[56] References Cited
UNITED STATES PATENTS
2,783,080  2/1957  Ringsby .................. 280/423 R X
3,203,711  8/1965  Chew ..................... 280/423 A X
3,542,390  11/1970 Fikse ..................... 280/423 A
3,612,575  10/1971 Stewart .................. 280/474
3,801,137  4/1974  Zucca .................... 280/474 X Primary Examiner—Leo Friaglia
Assistant Examiner—R. Schrecengost
Attorney, Agent, or Firm—Larson, Taylor & Hinds

[57] ABSTRACT

An extension module for a tractor or trailer of a heavy duty trailer system has a chassis supported by a row of axles through a suspension of low stiffness as compared to the suspension of the tractor or trailer. The module is connected to the tractor or trailer by a vertical pivot which only allows for rotation of the module with respect to the tractor or trailer about a vertical axis.

10 Claims, 7 Drawing Figures

EXTENSION MODULE FOR A VEHICLE TO BE INCORPORATED IN A TRAILER SYSTEM

The present invention relates to heavy duty vehicles and it relates more particularly to an extension module for a vehicle adapted to be included in tractor-trailer systems as well as trailer systems incorporating such a module.

There have already been produced or proposed trailer vehicles, and especially semi-trailers, each comprising more than two rows of several axles. To avoid any slewing, at least the axles of the back row are made self-steering, or a steering mechanism, for at least the back row of axles, presenting an extreme complication is provided, such a steering mechanism includes a hydraulic or mechanical system using cables and pulleys or tie rods and links, or an electrical system controlled from the cabin of the tractor or automatically by the angular "divergence" between the tractor and the semi-trailer. Now these solutions are far from being entirely satisfactory, since they are complicated, expensive; their reliability and maintenance cost are generally not acceptable. Moreover, if the axles of all rows are rendered steerable, the advantage represented by the wheels of the trailer following in the tracks of those of the tractor is largely offset by the difficulties arising from the space to be provided for the rotary latitude of the axles. If only the axles of the back row are self-turning, there is practically no reduction in the width swept by the semi-trailer on turning.

It is known also that the possibilities of trailer systems constituted by tractor and a simple semi-trailer are limited by the low loading capacity of road tractors which have at the maximum four axles (one or two front steering axles and two rear axles in tandem). This disadvantage cannot be offset by multiplying the number of wheels of the semi-trailer to increase its ground load, since the ratio of the number of driven wheels to the number of drive wheels diminishes and the road adherence ratio becomes sufficient.

Attempts have been made to resolve this problem by the use of intermediate semi-trailers called "bissels" bearing a saddle of high capacity whose load is distributed between the tractor and the train of wheels of the bissel. However, this solution increases enormously the dead weight, increases the bulk in height and in length of the trailer system, has a disastrous influence on the handlability and affects the transversal stability due to the fact of the superposition of two saddles.

It is an object of the present invention to overcome the drawbacks of the above-mentioned earlier solutions.

To this end, according to the invention, there is provided an extension module for a heavy duty vehicle of a trailer system, said vehicle having a plurality of rows of $n$ axles ($n$ being at least equal to 1) and a suspension of high stiffness, which module comprises a chassis borne by a row of $n$ axles through a suspension with large latitude and low stiffness, articulated to the chassis of the vehicle by a single vertical pivot situated in the middle plane of the vehicle and to the rear of the latter, with high flexing resistance in a vertical plane.

Due to this feature, the wheels of the module coupled to a trailer vehicle follow in a satisfactory manner the tracks of the wheels of this vehicle due to the caster action of the latter, and the width swept on a turn by the trailer system thus constituted, approaches the minimum which would be offered by a single vehicle of which all the axles would be steering axles. The assembly has an extremely high robustness, the single pivot being able to occupy the whole height of the central longitudinal member of the vehicle. Lastly, the row of axles of the driven module corresponds to a wide track, and consequently the stability in steering is much enhanced and the risk of shimmy is much lower than in the case of a vehicle whose all axles of the back row are independently self-steering.

In the case where the module is coupled to the tractor in a trailer system, the wheels of the module follow in a satisfactory manner the wheels of the tractor, the robustness remains extremely high as in the preceeding case and it is very easy to give the module a suspension whose latitude of movement is high as compared with that of a tractor of high tonnage, whose suspension is always stiff.

The module according to the invention has the additional advantage of being, as required, coupleable or separable from the vehicle for which it is provided. Thus, according to the needs, the user can choose between the use of the tractor and of the trailer vehicle alone, the use of the trailer system completed by a module fixed to the tractor or to the trailer, and the use of the trailer system completed by two modules.

The invention has a very particular advantage when the towed vehicle is constituted by a semi-trailer provided with a single row of longitudinal walking beams each with two axles. The row of walking beams, on which the axles can be directly mounted, gives an almost infinite stiffness, since the walking beams ensure simply a distribution of load. In this case, by providing all the axles of the module with a suspension which renders the ground support equivalent of a support at a single point, in the middle plane, all redundancy of the supports is avoided and an entirely satisfactory suspension is obtained. This result is achieved particularly by providing the axles of the trailer with a hydraulic suspension of which all the jacks are connected to one accumulator or by providing them with a pneumatic suspension with an automatic level setting system.

Figure 2:
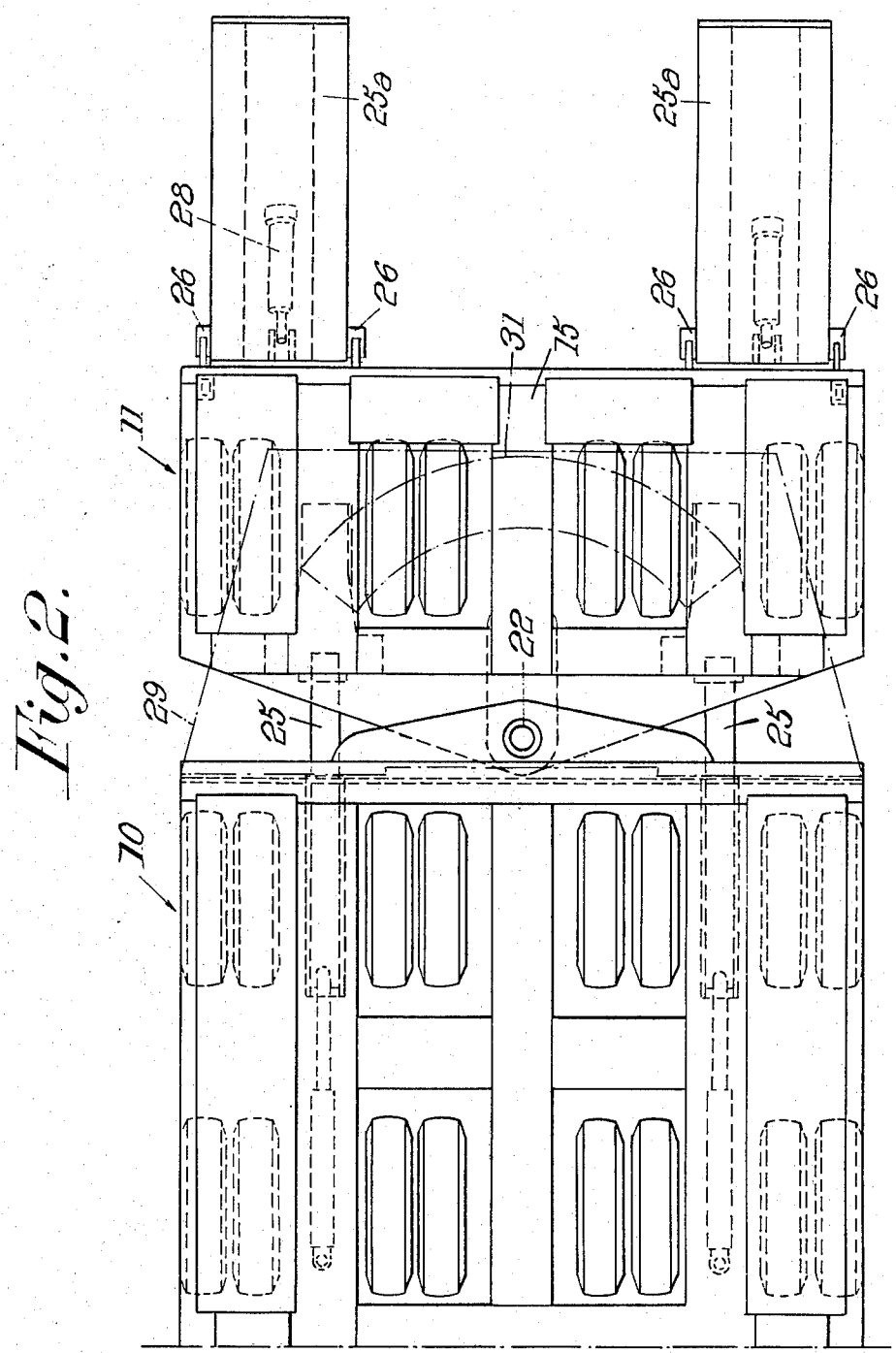
Figure 3:
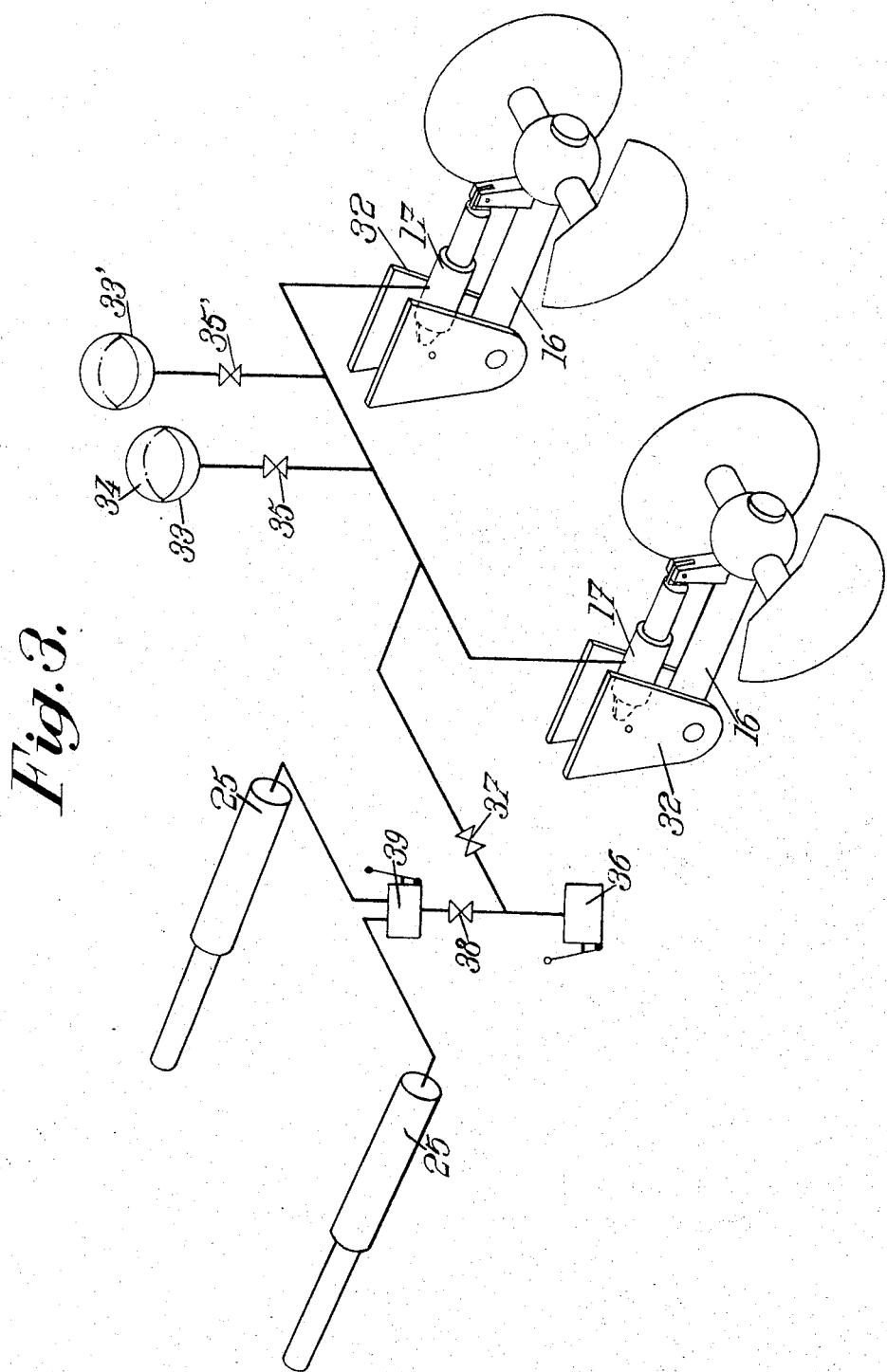
Figure 4:
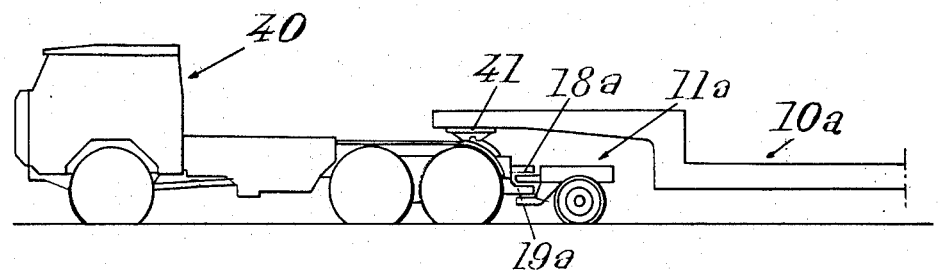
Figure 5:
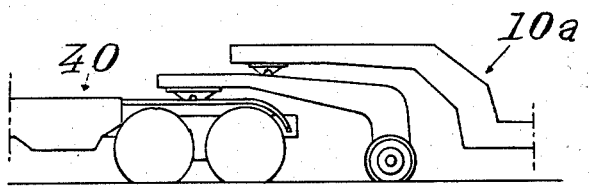
Figure 6:
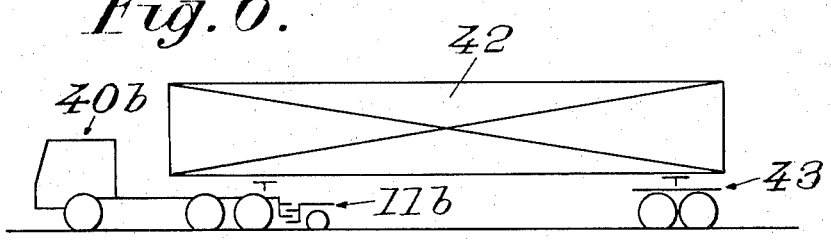
Figure 7:
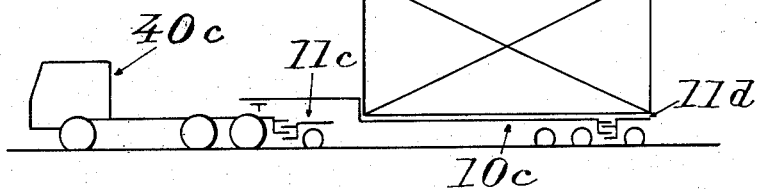

The invention will be better understood by reading the description which follows of devices which constitute particular embodiments thereof, given primarily by way of non-limitative examples. The description refers to the accompanying drawings in which:

FIG. 1 is a simplified diagram showing, in elevation, one embodiment of an extension module and the rear part of the semi-trailer to which it is coupled, FIG. 2 is a view from above of the embodiment of FIG. 1, FIG. 3 is a simplified diagram of the hydraulic suspension and forced orientation circuit with which the embodiment of FIGS. 1 and 2 is equipped, FIG. 4 is a simplified diagram showing, in elevation, an embodiment of an extension module coupled to a tractor as well as the front of a semi-trailer resting on the tractor, FIG. 5 shows, by way of comparison, the interposition of a bissel between a tractor and a semi-trailer similar to those of FIG. 4, FIGS. 6 and 7 are diagrams showing two trailer systems equipped with extension modules according to the invention.

The trailer system of which the rear portion is shown diagrammatically in FIGS. 1 and 2 comprises a semi-trailer 10 and an extension module 11. The semi-trailer is of conventional type. It has, in the front, a swan-neck intended to be supported on the saddle member of the tractor. However, it has, at its rear end, additional members intended to cooperate with the module 11. The semi-trailer shown is carried at the front by the tractor and, at the rear, by a row of two walking beams of which one, 12, appears in FIG. 1. Each of the walking beams is provided with two axles each with four twin wheels. The axles shown are provided with pneumatic action brake cylinders 13. Naturally, it would also be possible to provide a semi-trailer with a pneumatic suspension, but this solution does not seem of advantage due to the large cross-sections necessary for the suspension cushions and the complexity of the trim maintaining valves which are then necessary.

In the case of a trailer system according to the invention, the use of walking beams has the advantage of corresponding to a suspension of very high rigidity, hence of very low variation in level of the chassis 14 of the semi-trailer with respect to the ground, and to the best possible transverse stability, the walking beams distributing the load between the axles by their tilting. There is thus achieved a satisfactory maintenance of height above ground with a much simpler arrangement than that involved in a pneumatic suspension.

The extension module 11 comprises a chassis 15 which can have a constitution similar to that of the semi-trailer, that is to say comprises a central longitudinal member and two lateral longitudinal members connected by transversal members. This module is carried by two axles, each having four twin wheels, mounted on rocking arms 16 of which one appears in FIG. 1. These axles have a suspension which is advantageously a hydraulic cylinder suspension 17.

The extension module is connected to the semi-trailer 10 by a system enabling it to pivot around a vertical axle situated in the middle plane of the semi-trailer whilst preventing it from rotating around a horizontal axle with respect to the semi-trailer to transmit to the axles of the module a portion of the load of the semi-trailer. This pivoting system comprises, at the rear of the semi-trailer, two superposed yokes 18 and 19 and, in the front of the module, two yokes 20 and 21 which can be interleaved with the preceding ones. In coaxial passages in all the yokes there is engaged a pivot axle 22 which can be locked in position by means of a key and comprises, at its upper part, a lifting ring (not shown). It is around this axle that the pivoting of the module with respect to the semi-trailer can be effected. Bearing parts can obviously be inserted between the yokes to facilitate rotary sliding.

It is seen that the articulation thus constituted can be extremely robust and moreover, only transmits, between the module and the semi-trailer, forces that the chassis of the latter can withstand under good conditions. The pivot is positioned exactly in line with the central longitudinal member of the semi-trailer. Provided that the module has a suspension with a large vertical latitude of movement and low stiffness for which the variations in load on the ground are relatively small, the torsional forces around a longitudinal axis which will be communicated by the module to the semi-trailer will remain very moderate on condition that the initial adjustment of the height of the module has been satisfactory. Means can be provided to permit this adjustment and they will be described below.

To support the module when it is uncoupled, it is advantageously provided with corner props of which one, 23, is shown in FIG. 1. These props are placed in the rear corners of the module, opposite the pivot. They are advantageously adjustable in height by means of cranks 24, for example to enable adjustment of the position of the module when it is desired to couple it to a semi-trailer by causing the latter to move backward.

In going backwards, it is necessary to lock the module in position with respect to the semi-trailer. For this purpose, the module illustrated in FIG. 2 comprises jacks 25 associated with a hydraulic control system which will be described below, which can be supplied in opposite directions to locate the module angularly and especially to bring it into alignment with the semi-trailer. These jacks could also just as well be provided on the semi-trailer. Incidentally, it must be noted that such locking in alignment is easier than that of self-turning axles of a back row of a conventional semi-trailer where the number of locks to be provided requires the use of mechanical means generally constituted by a single key engaged in aligned apertures. The use of two jacks acting laterally up to the end of the course is much more gradual and certain. Incidentally, the use of jacks also enables, in backward manoeuvres, the orientation of the module by direct handling of a valve provided for this purpose through a driving aid. However, in an even simpler embodiment, locking jacks for alignment can be replaced by simple locks or mechanical blocks for example constituted by foldable lips.

To enable public work vehicles to be loaded, it is necessary to provide access ramps 25a. To receive these ramps, the module 11 is provided, at the back, with receiving ears 26. Given that the semi-trailer is advantageously provided to be usable without the extension module, the ears 26 are advantageously identical with the receiving ears 27 carried at the rear end of the semi-trailer. Thus, it is possible to mount the ramps either on the module, or on the semi-trailer. In the embodiment illustrated by way of example, the ramps 25a are provided with their own lifting jacks but their presence is obviously not indispensable.

Given that, in the operation of the trailer system, the module turns around the pivot 22, it is advantageously provided with the plate 29 (shown in dash-dot lines in FIG. 2) which can be rendered fast to the semi-trailer 10 and in sliding support against the upper surface of the chassis of the module. There may especially be used a plate of the type shown in FIGS. 1 and 2 constituted by a thick metal sheet, of trapezoidal shape, having at the front a 90° rim 30, for engagement in a retaining channel provided for this purpose at the rear of the trailer 10. The lower surface of the plate 29 advantageously bears a sector 31 of a material with a low frictional coefficient, such as polytetrafluorethylene, to facilitate the sliding of the plate on the chassis of the module. This sector could besides be replaced by a layer of material with low coefficient friction borne by the upper surface of the chassis of the module. The rim is cut away in its central part in order not to impede the passage of the pivoting axle whose length is advantageously equal to the height of the longitudinal member.

Finally, the module and the semi-trailer must carry necessary electrical and hydraulic connections. In fact, the connections are reduced to the elements of a standard electrical connector and to a single pneumatic connector to the extent where the axles of the module may not be provided with safety brakes controlled from the vehicle.

The hydraulic circuit of the module can be that illustrated diagrammatically in FIG. 3, which has the advantage of reducing the support on the ground of the module to the equivalent of support at one point, giving the semi-trailer/module assembly a support substantially isostatic, hence very favourable to the reduction of stresses in the structure.

In FIG. 3 are shown diagrammatically the axles of the module (without the twin wheels). Each of the axles is provided with its hydraulic suspension jack 17 mounted between a tilting arm 16 and a yoke 32 fast to the chassis of the module. The compartments of the hydraulic jacks are connected to a common hydraulic accumulator 33 and communicate between themselves. This forms in hydraulic manner the equivalent of a transversal walking beam between the axles of the module. The volume of the gas chamber 34 of the accumulator 33 is chosen advantageously such that the pressure in the suspension jacks 17 varies little as a function of the vertical latitude of movement. This result is achieved in rather simple manner with an accumulator of moderate bulk, since, with an accumulator of ten liters, the ground load variations do not exceed 1/5 between the limits of movement if each cylinder has a capacity of one liter.

It is also possible to provide, as indicated diagrammatically in FIG. 3, a second accumulator 33' which can be placed in parallel with the first or substituted for the first by manipulating valves 35 and 35' so as to modify the stiffness of the suspension. By using one or other of the accumulators or the two together, three ranges of flexibility are obtained.

The hydraulic suspension circuit comprises advantageously a manually controlled pump 36 which permits "inflation" at will of the suspension circuit, hence adjustment of the height of the module 11 connected with the props 23. Moreover, this pump enables regulation of the distribution of the loads between the axles of the module and those of the semi-trailer, as a function for example, of the overall load provided, once the coupling has been effected. Between the pump 36 and the suspension, there may be provided an isolating valve 37. The pump 36 can then be used alternately to adjust the suspension and to actuate the circuit of the alignment jacks 25 to which it is connected by a second isolation valve 38. A manually actuated distributor 39 enables oil to be directed coming from the pump 36 to one or other of the jacks 25 by bringing back oil coming from the other jack to a discharge pump.

By way of example, it may be indicated that a particularly interesting trailer system can be constituted by associating a trailer 48 tons ground load and an extension module enabling the useful load to be brought to a value comprised between 60 and 70 tons. It must be noted on this subject that often the loads to be transported on vehicles of this type are constituted by public work equipment of which the tool (bulldozer blade, mechanical bucket, etc.) rests on the rear of the trailer, the equipment being advanced to the maximum on the semi-trailer to apply a suitable fraction of the load on the saddle of the tractor. It will be possible, in the case of a trailer system according to the invention, to arrange the equipment further towards the rear, hence to load the swan-neck and the saddle less or, for an equal load on the saddle, to transport heavier equipment.

Moreover, if the plate 29 is provided, the supporting length is increased at the same time as the useful load.

FIG. 4, where the corresponding members to those of FIGS. 1 to 3 bear the same reference numbers modified by the index $a$, shows a trailer system consisting of a tractor 40 with three rows of axles, an extension module 11$a$ coupled to the tractor and a semi-trailer 10$a$ supported on a saddle 41 of the tractor and of which the front alone is shown. The module 11$a$ can be identical with the module 11 described above and the rear of the tractor 40 is then provided with two yokes 18$a$ and 19$a$ whose shape and arrangement are the same as those of the yokes 18 and 19 of the semi-trailer. These yokes 18$a$ and 19$a$ are fixed on the rear crossed members of the tractor.

Comparison between FIG. 4 and FIG. 5, which show the arrangement in the case of the use of a bissel 42, demonstrates the gain in longitudinal bulk introduced by the use of the module. Moreover, the fact that this module according to the invention enables the use of an additional saddle to be dispensed with and does not complicate in practice the electrical and pneumatic connections, results in economy. The module enables, under difficult conditions of operation, modification of the relative adherence of the wheels of the vehicle by modifying the pressure in the suspension device of the module. By acting on this pressure, it is possible to effect lifting of the wheels for unloaded return journeys. There even may be envisaged the provision on the wheels of the module of hydraulic motors normally out of service, but which can be temporarily supplied by a hydraulic pump from the motion take up of the tractor.

On condition that the rear of each of the vehicles of the same fleet is provided with identical yokes, it is possible to complete each of these vehicles to increase its capacity, so that the addition of some extension modules to a fleet increases considerably the flexibility of use and the capacity of transportation. By way of examples, FIGS. 6 and 7 show two possible arrangements: in the case of FIG. 6, the tractor 40$b$ provided with an extension module 11$b$ supports the front of a load 42 of which the rear rests on a trailer 43. Again by way of example, the respective loads can be 8 tons on the front axle of the tractor, 13 tons on each of the rear axles, 16 tons on the module 11$b$, 13 tons on each of the rear axles of the trailer 43.

In the case of FIG. 7, the tractor 40$c$ again provided with an extension module 11$c$ supports the front of a semi-trailer 10$c$ provided also with an extension module 11$d$. The loads on the axles of the tractor being the same as above, the two axles of the trailer and the module can each support 16 tons.

I claim:

1. In a trailer system including a heavy duty vehicle provided with several rows of $n$ axles, $n$ being an integer at least equal to 1, an extension module for said vehicle having a chassis supported by a row of $n$ axles through a suspension of low stiffness as compared to the suspension of said vehicle, and pivot means for coupling the module and the vehicle for pivotal movement of the module about a vertical axis located in the longitudinal midplane of the vehicle at the rear thereof and against pivotal movement about a horizontal axis.

2. Trailer system according to claim 1, wherein the $n$ axles of the extension module are provided with fluid pressure suspension jacks placed in communication for the ground support of the module to be equivalent to a support at one point.

3. Trailer system according to claim 1, wherein said module is provided with lateral support props, adjustable in heigth, situated opposite the pivot with respect to said axles.

4. Trailer system according to claim 1, having longitudinal fluid pressure jacks, each comprising a cylinder carried by said module on a respective side thereof, piston means reciprocably mounted in said jack for abutting connection with said vehicle, and means for controlling said jacks for forced angular movement of the module with respect to said vehicle.

5. Trailer system according to claim 1, wherein said vehicle is constituted by a semi-trailer coupled to a tractor, and the semi-trailer comprises a single row of two walking beams each separately pivotally connected to a chassis of the semi-trailer with two axles, constituting, with the row of axles of the module, a substantially isostatic suspension.

6. Trailer system according to claim 5, wherein the module and semi-trailer are provided with identical loading ramp articulation ears.

7. Trailer system according to claim 5, having a removable support plate, connected to the semi-trailer against rotation and slidably supported by the module.

8. Trailer system according to claim 7, wherein the plate has a front vertical bend and the semi-trailer has a rear channel for receiving said bend and supporting the plate.

9. Trailer system according to claim 7, wherein said plate is provided with a coating of material of low coefficient of friction on its lower surface in contact with the chassis of the module.

10. Trailer system according to claim 1, wherein said extension module is connected to a tractor towing a trailer or semi-trailer.

* * * * *